FIG. I

United States Patent Office 3,554,061
Patented Jan. 12, 1971

3,554,061
APPARATUS AND METHOD FOR INDICATING UNBALANCE AND CONTROLLING BALANCING OF A BODY
Paul Holdinghausen, Bickenbach, Germany, assignor to Carl Schenck Maschinenfabrik GmbH, Darmstadt, Germany, a corporation of Germany
Filed Mar. 12, 1969, Ser. No. 806,622
Claims priority, application Germany, Mar. 16, 1968, 1,698,165
Int. Cl. B23b *35/00, 49/00;* G01m *1/38*
U.S. Cl. 77—5         11 Claims

ABSTRACT OF THE DISCLOSURE

A light spot representing an unbalance value of a body of direction and magnitude is indicated on the screen of a cathode ray tube and is positioned on the screen relative to a reference point in accordance with the sum and angular position of the unbalance. The unbalance values of direction and magnitude are stored. A line of light is produced on the screen extending from the reference point and indicates the instantaneous position of the unbalance on the body. The unbalance of the body is balanced and the light line is adjusted relative to the light spot by rotating the body. The unbalance of the body is removed and the light line is removed in accordance with the removal of the unbalance commencing with the reference point and toward the center of the light spot until the light spot is reached.

DESCRIPTION OF THE INVENTION

The present invention relates to the indication of unbalance in a body. More particularly, the invention relates to apparatus and a method for indicating unbalance and controlling balancing of a body.

In order to correct or balance unbalance in a rotating rigid specimen or body in accordance with magnitude and angular position, it is necessary to indicate the magnitude and angular position of the unbalance and to control the balancing process accordingly. Known balancing apparatus indicates the magnitude of unbalance in two planes. The corresponding angular positions of the unbalance are indicated during the indicating operation by a Braun tube. This method has a disadvantage in that a separate indication of the unbalance magnitudes or values, in accordance with direction and magnitude, is provided only during the indicating operation, and a new control operation must be undertaken, after the balancing operation, in order to control the quality of balancing with respect to the magnitude and angular position.

Another method of indicating the unbalance values in a plane, in accordance with length and magnitude, utilizes optical devices to produce a light spot on a dial plate. The light spot indicates the position as well as the magnitude of the unbalance relative to a reference point on the dial. The disadvantage of this method is that the limit frequency of the device is fixed in its dependence upon the considerable number of optical instruments required and the light intensity of the unbalance indication is limited by the optical transmission.

Other known systems separate the instantaneous values of alternating currents produced by electromechanical transducers from unbalance vibrations or oscillations of the specimen or body into two instantaneous values or magnitudes. The separated instantaneous magnitudes are displaced 90° in phase relative to each other. The electromechanical transducers are connected to an indicating device for short periods, only during the pickup or sensing of the instantaneous magnitudes. Errors inevitably occur in the indications due to variations of external frequency, so that such method is not suitable for exact unbalance indicating processes and cannot be utilized to control the balancing or correction operation.

The principal object of the present invention is to provide a new and improved method for indicating unbalance values of a body and for controlling the balancing of the body.

An object of the present invention is to provide new and improved apparatus for indicating unbalance values of a body and for controlling the balancing of the body.

An object of the present invention is to provide apparatus and a method for indicating unbalance of a body with accuracy, efficiency, effectiveness and reliability.

An object of the present invention is to provide apparatus and a method for indicating unabalance of a body, which apparatus and method avoid the disadvantages of known methods and apparatus.

An object of the present invention is to provide apparatus and a method for indicating unbalance values of a body, wherein the disadvantages of known apparatus and methods, including the indication of unbalance angular position only during the indicating process, the disruption of indication by external frequency variations, and the adverse effect of optical transmission upon the light intensity of the indication, are overcome.

An object of the present invention is to provide apparatus and a method for indicating unbalance of a body, which apparatus and method provide a simultaneous indication on the screen of a cathode ray tube of the unbalance magnitudes and directions of a plurality of different planes.

An object of the present invention is to provide apparatus and a method for indicating unbalance of a body, which apparatus and method control a balancing operation for each of a plurality of different planes, individually, without the need for a subsequent control operation for evaluating the balancing quality.

In accordance with the present invention, in indicating unbalance in a number of planes, a number of light spots are utilized to indicate the unbalance values in accordance with direction and magnitude. The light spots are projected, simultaneously for the different planes, on the screen of an electron or cathode ray tube. The information supplied to the cathode ray tube is first stored and the data forming a light line is adjusted to the corresponding light spot, sequentially for the different planes, on the screen. The balancing operations are effected in a manner whereby the position of the light line on the balance point on the body or specimen. After the light spot is adjusted to the light line, by rotating the body, the light line is removed in the direction of the light spot in accordance with the correcting or balancing operation balance. The light lines for the different planes are in time division multiplex relation and each light line extends from a reference point on the screen. The light lines thus indicate the instantaneous position of an unscreen of the cathode ray tube, relative to the light spot, indicates the magnitude and angular position of the unand the balancing operation is completed when the light spot is reached.

Thus, in accordance with the present invention, a method for indicating unbalance values of a body and for controlling the balance of the body comprises the steps of simultaneously indicating on the screen of a cathode ray tube light spots representing unbalance values of the body of direction and magnitude in different planes; positioning the light spot on the screen relative to a reference point in accordance with the sum and angular position of the unbalance; storing the unbalance values of direction and magnitude in different planes; producing a line of light on the screen extending from the reference point and indicating the instantaneous position of the unbalance of the body; balancing unbalance of the body and adjusting the light line relative to the light spots sequentially for the different planes by rotating the body; and removing the unbalance of the body and removing the light line in accordance with the removal of the unbalance of the body commencing with the reference point and toward the light spot until the light spot is reached.

In another embodiment of the present invention, a method for indicating unbalance of a body involves a single plane. A light spot is provided on the screen of the cathode ray tube and has a center relative to a reference point on the screen. The light spot indicates the magnitude and angular position of unbalance of the body. Data representing the magnitude and angular position of unbalance is stored and is then supplied to the cathode ray tube to produce a light line extending from the reference point on the screen and indicating the instantaneous position of unbalance of the specimen or body. The light line is adjusted relative to the center of the light spot, via rotation of the body, and the balancing or correcting operation is instituted. The line of light is removed in correspondence with the progress of the balancing operation, beginning at the reference point on the screen, in the direction of the center of the light spot. When the center of the light spot is reached the balancing operation is completed.

Thus, in accordance with another embodiment of the present invention, a method for indicating unbalance values of a body and for controlling the balancing of the body comprises the steps of indicating on the screen of a cathode ray tube a light spot representing an unbalance value of the body of direction and magnitude in a single plane; positioning the center of the light spot on the screen relative to a reference point in accordance with the sum and angular position of the unbalance; storing the unbalance values of direction and magnitude; producing a line of light on the screen extending from the reference point and indicating the instantaneous position of the unbalance on the body; balancing unbalance of the body and adjusting the light line relative to the light spot by rotating the body; and removing the unbalance of the body and removing the light line in accordance with the removing of the unbalance of the body commencing with the reference point and toward the center of the light spot until the light spot is reached.

In the methods of the present invention, the light spots are produced by direct voltages corresponding to the components of the unbalance vector.

In accordance with the present invention, direct voltages are provided which are characteristic of the magnitudes of unbalance and are stored in memory units. Voltages are also provided which are characteristic of the position of the balance correcting tool. The instantaneous voltages are conjointly applied to adding and deflecting amplifiers in time division multiplex relationship. Included with the voltages applied to the adding and deflecting amplifiers, are voltages characteristic of the angular position of the unbalance. The adding and deflecting amplifiers are for the horizontal and vertical deflecting plates of the cathode ray tube and are connected to the corresponding pairs of plates. Thus, in accordance with the present invention, apparatus for indicating unbalance values of a body and for controlling the balancing of the body comprises memory means having inputs and outputs. A first input is connected to the inputs of the memory means for supplying electrical signals to the memory means in accordance with unbalance values of the body. The memory means provides at its outputs direct voltages characteristic of the unbalance values. A horizontal adding and deflecting amplifier provides horizontal deflection voltages. A vertical adding and deflecting amplifier provides vertical deflection voltages. A switch provides electrical signals supplied thereto in time division multiplex arrangement. An integrator integrates electrical signals. A second input is coupled to the inputs of the horizontal and vertical adding and deflecting amplifiers via the switch for supplying voltages characteristic of the position of balance correcting means in time division multiplex arrangement. A third input is coupled to the inputs of the horizontal and vertical adding and deflecting amplifiers via the integrator for supplying voltages characteristic of the angular position of unbalance in the body. A cathode ray tube has a screen and electron means for producing a stream of electrons and directing the stream of electrons onto the screen. Horizontal deflection means connected to the output of the horizontal adding and deflecting amplifier control the horizontal displacement of the stream of electrons on the screen. Vertical deflection means connected to the output of the vertical adding and deflecting amplifier control the vertical displacement of the stream of electrons on the screen.

A function switch is connected between the memory means and the second input and the switch for selectively supplying the direct voltages characteristic of the unbalance values and the voltages characteristic of the position of balance correcting means to the switch. The function switch has three switching positions. In a first switching position, the inputs of the memory means are connected to the switch thereby supplying unbalance values for two planes during rotation of the body. In a second position of the function switch, selected outputs of the memory means and the second input are connected to the switch thereby storing the unbalance values of the two planes and permitting the body to be brought to a standstill and causing the light line on the screen of the cathode ray tube to indicate the insertion angle for one of the two planes and the depth of penetration of balance correcting means. In a third position of the function switch, selected other inputs of the memory means and the second input are connected to the switch thereby storing the unbalance values of he two planes and permitting the body to be brought to a standstill and causing the light line on the screen of the cathode ray tube to indicate the insertion angle for the other of the two planes and the depth of penetration of the balance correcting means.

A fourth input coupled to the horizontal and vertical adding and deflecting amplifiers via the switch supplies additional small sinusoidal voltages to the horizontal and vertical adding and deflecting amplifiers to indicate the light spot. The sinusoidal voltages supplied by the fourth input are superimposed upon the direct voltages characteristic of the unbalance components.

A fifth input coupled to the inputs of the horizontal and vertical adding and deflecting amplifiers supplies additional small sinusoidal half-wave voltages to the horizontal and vertical adding and deflecting amplifiers to represent the plane of the light spot. The sinusoidal half-wave voltages supplied by the fifth input are superimposed upon the direct voltages characteristic of the unbalance components.

In order that the present invention may be readily carried into effect, it will now be described with reference to the accompanying drawings, wherein:

FIG. 1 is a schematic block diagram of an embodiment of the apparatus of the present invention for indicating unbalance values of a body and for controlling the balancing of the body;

Figure 6:
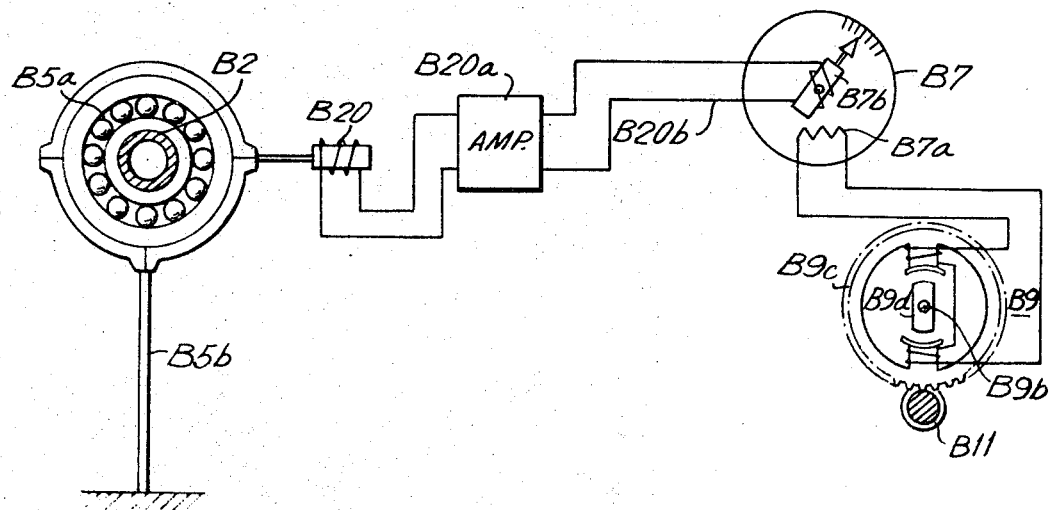
Figure 7:
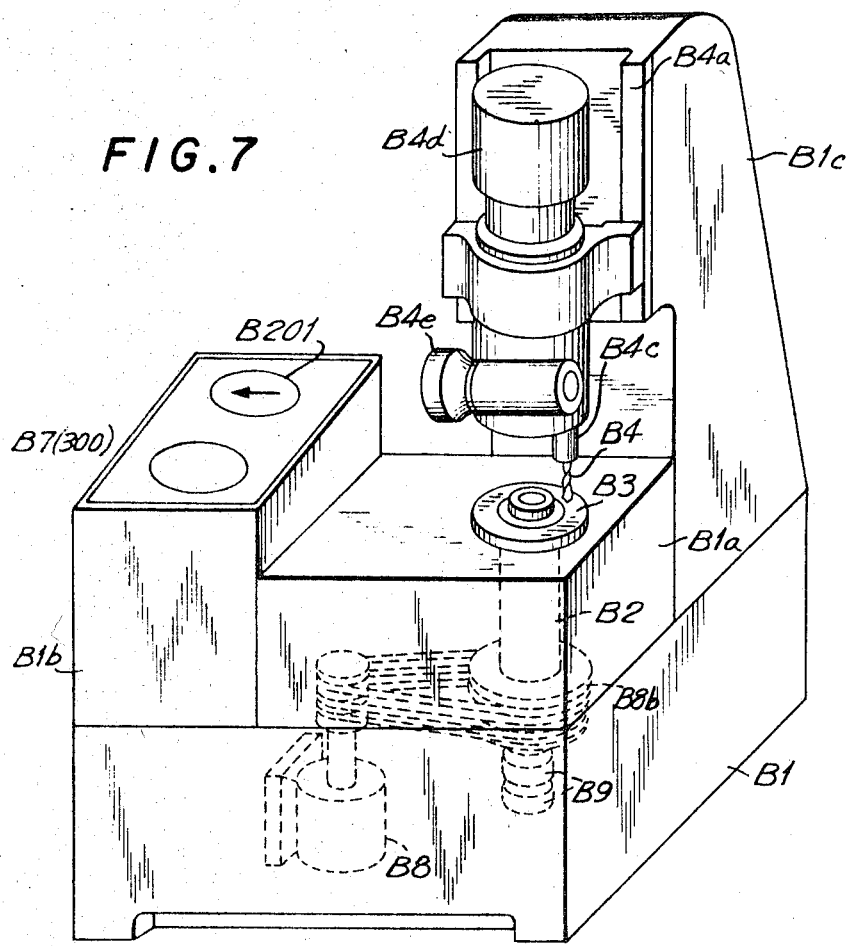

FIGS. 6 and 7 are FIGS. 3 and 1 of U.S. Pat. No. 2,933,984; and

Figure 8:
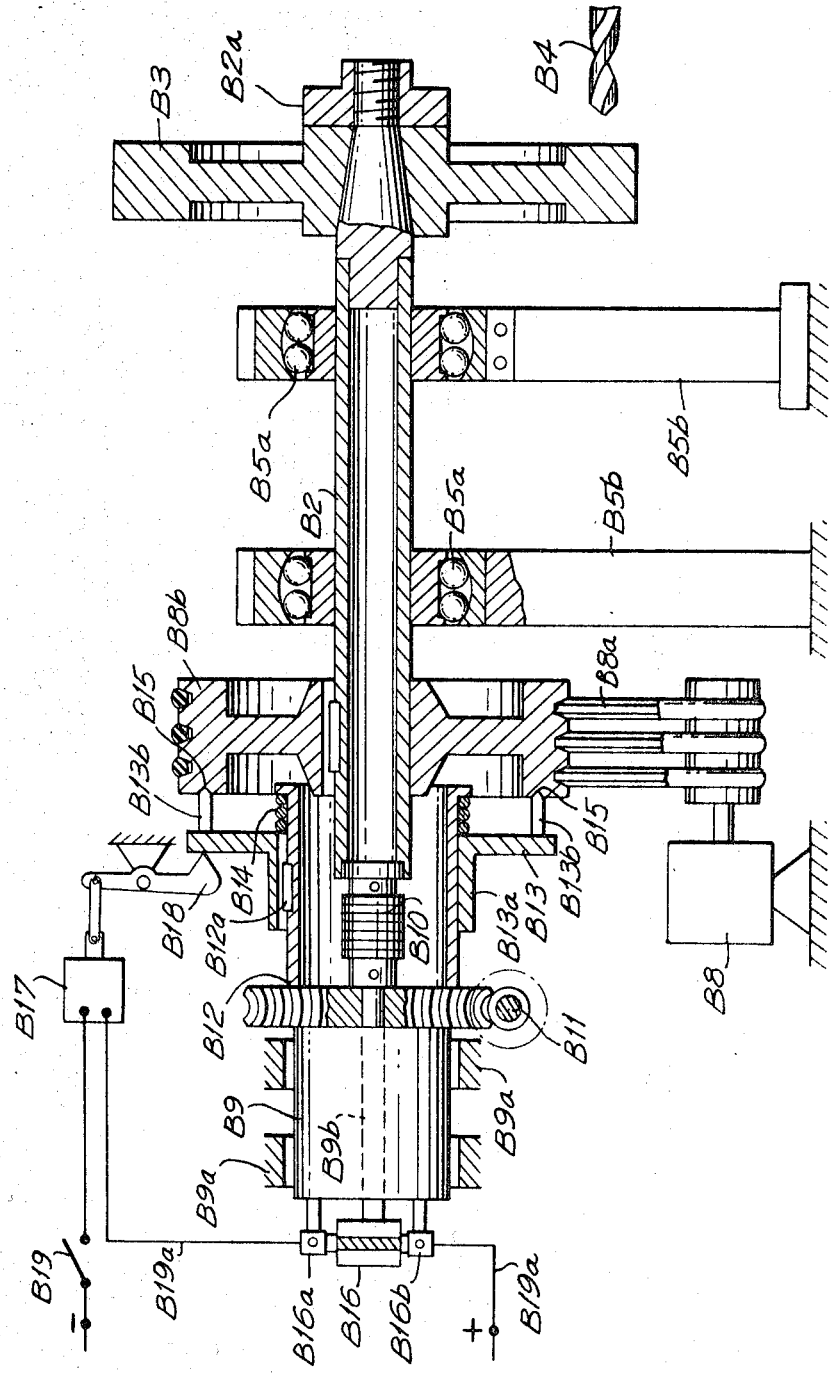

FIG. 8 is FIG. 2 of U.S. Pat. No. 2,933,984.

In FIG. 1, balancing apparatus 99 of any suitable type provides a plurality of output voltages which are applied to terminals 100, 101, 140, 141, 160, 161, 98 and 97. The terminals 100, 101, 160 and 161 comprise a first input to the unbalance value indicating circuit of the present invention. The terminals 140 and 141 comprise a second input to the unbalance value indicating circuit of the present invention. The terminals 97 and 98 comprise a third input to the unbalance indicating circuit of the present invention. A pair of terminals 113 and 114 comprise a fourth input to the unbalance value indicating circuit of the present invention and a pair of terminals 110 and 111 comprise a fifth input to the unbalance value indicating circuit of the present invention.

The terminals 100 and 160 are connected to corresponding inputs of a horizontal memory 116. The terminals 101 and 161 are connected to corresponding inputs of a vertical memory 117. The terminals 97 and 98 are connected to corresponding inputs of an angle position device 134. The outputs of the angle position device 134 are connected to corresponding inputs of an integrator or integrating circuit 130 via corresponding leads 131 and 132.

A function switch 150 comprises a plurality of switch arms 150a, 150b, 150c and 150d, mechanically coupled to each other so that they operate in unison. Each of the switch arms 150a to 150d is fixedly connected at one end to a corresponding input of an electronic switch 105. The free end of each of the switch arms 150a to 150d of the function switch selectively electrically contacts a corresponding one of fixed contacts 180a, 180b, 180c and 180d, when the function switch 150 is in a first position. When the function switch 150 is in a second position, the free end of each of the switch arms 150a to 150d selectively electrically contacts a corresponding one of fixed contacts 181a, 181b, 181c and 181d. The free end of each of the switch arms 150a to 150d selectively electrically contacts a corresponding one of fixed contacts 182a, 182b, 182c and 182d, when the function switch 150 is in a third position.

The terminals 113 and 114 are connected to corresponding inputs of the electronic switch 105 via corresponding leads 113a and 114a. An output 130a is connected to the input of a horizontal adding and deflecting amplifier 108 via a manual switch 96a, a resistor 95a, a lead 94 and a lead 93. Another output 130b is connected to the input of a vertical adding and deflecting amplifier 109 via a manual switch 130b, a resistor 95b, a lead 92 and a lead 91.

An output 106 of the electronic switch 105 is connected to the input of the horizontal adding and deflecting amplifier 108 via a resistor 95c, the lead 94 and the lead 93. An output 142 of the electronic switch 105 is connected to the input of the horizontal adding and deflecting amplifier 108 via a resistor 95d, the lead 94 and the lead 93. An output 107 of the electronic switch 105 is connected to the input of the vertical adding and deflecting amplifier 109 via a resistor 95e, the lead 92 and the lead 91. An output 143 of the electronic switch 105 is connected to the input of the vertical adding and deflecting amplifier 109 via a manual switch 130b, a resistor 95b, a lead 92

An output 110 of the electronic switch 105 is connected to the input of the horizontal adding and deflecting amplifier 108 via a resistor 95g, the lead 94 and the lead 93. An output 90a of the electronic switch 105 is connected to the input of the horizontal adding and deflecting amplifier 108 via a resistor 95h, the lead 94 and the lead 93. An output 111 of the electronic switch 105 is connected to the input of the vertical adding and deflecting amplifier 109 via a resistor 95i, the lead 92 and the lead 91. An output 90b of the electronic switch 105 is connected to the input of the vertical adding and deflecting amplifier 109 via a resistor 95j, the lead 92 and the lead 91.

The output of the horizontal adding and deflecting amplifier 108 is connected to its input via a feedback resistor 89 and is provided at an output terminal 165. The output of the vertical adding and deflecting amplifier 109 is connected to its input via a resistor 88 and is provided at an output terminal 166. A cathode ray or electron beam tube 115 has a pair of vertical deflecting plates 136 and a pair of horizontal deflecting plates 137. Any suitable vertical and horizontal deflecting means may be utilized instead of the pairs of plates 136 and 137. The horizontal deflecting plates 137 are connected to the output terminal 165 of the horizontal adding and deflecting amplifier 108. The vertical deflecting plates 136 are connected to the output terminal 166 of the vertical adding and deflecting amplifier 109.

The circuitry and mechanism of each of the angle position device 134, the horizontal memory 116, the vertical memory 117, the integrator 130, the electronic switch 105, the horizontal adding and deflecting amplifier 108 and the vertical adding and deflecting amplifier 109 may comprise any suitable circuitry and mechanism known in the art. The balancing apparatus 99 may comprise any suitable known balancing apparatus. Such suitable balancing apparatus may comprise that disclosed in U.S. Pat. No. 2,933,984 and illustrated in FIGS. 6, 7 and 8.

For illustrative purposes, the operation of FIGS. 6, 7 and 8, which are FIGS. 3, 1 and 2 of U.S. Pat. No. 2,933,984, issued Apr. 26, 1960, is hereinafter explained.

The workpiece B3 to be balanced is to be firmly secured to the conical end B2a of carrier shaft B2, then the drive motor is switched on. When the workpiece rotates at the normal speed, the attendant observes the instrument B7 and actuates the worm drive B11 until the instrument pointer shows a maximum deflection. The instrument scale, calibrated in units of unbalance magnitude, such as grams or fractions of an ounce, then indicates a value indicative of the amount of material to be removed from the workpiece. This value is transmitted into the drill press to determine the depth limit for the subsequent drill feed. In principle, this can be done by manual adjustment, although a semi-automatic setting of the drill feed such as known from U.S. Pat. No. 2,682,046, may be utilized.

After the amount of unbalance is thus determined, the attendant actuates the worm drive B11 so as to reduce the indication of instrument B7 to zero by proper adjustment of the generator stator. The angular displacement of the stator has the effect that the sleeve B12 and the flange B13 with its pins B13b is set to a definite angular position with respect to the drill B4. Once the instrument B7 is zeroed in this manner, the attendant stops the drive motor B8 and thereafter turns the workpiece B3, for instance manually, until the circuit B19a is closed through switches B19 and B16. The control switch B19, normally open, may be closed manually, but it may also automatically close, for instance, under control by a centrifugal switch when the workpiece B3 coasts down to standstill. The closing of circuit B19a causes the magnet B17 to actuate the lever B18 and to force the flange B13 with pins B13b in opposition to spring B14 into locking engagement with the recesses B15 of sheave B8b. The tips of pins B13b as well as the recesses B15 are preferably made conical in order to secure an accurate setting of the sheave B8b relative to the angularly preadjusted pins B13b. As a result, the sheave B8b and thus also the carrier shaft B2 with the workpiece B3 are arrested accurately in the predetermined angular position. The proper engagement of the latching pins B13b with the recesses of sheave B8b may be indicated to the operator by means of a signal lamp (not illustrated).

The workpiece B3 is now correctly oriented for the unbalance removing operation and is so arrested that it cannot turn about its axis during that operation. The drill press is now operated and the drill bit B4 now enters exactly into the too-heavy location of the workpiece to remove material in accordance with the precedingly determined magnitude of unbalance.

The locking of the rotor is subsequently eliminated by opening the control switch B19, whereupon the spring B14 is effective to remove the flange B13 and the pins B13b from latching engagement with the sheave B8b.

The electronic switch 105 is so controlled that four different voltages are applied to the vertical and horizontal deflection plates 136 and 137 of the cathode ray tube 115 to control the deflection or displacement of the stream of electrons of said cathode ray tube on the screen thereof. As shown in FIGS. 3a and 3b, during the first and second time periods 1 and 2 of a cycle, a light spot 10 (FIGS. 2a, 2b and 2c), corresponding to the unbalance vector or values, is produced by these voltages. More particularly, direct voltages 100 and 101 (FIGS. 3a and 3b) are applied to the terminals 100 and 101, respectively (FIG. 1). The direct voltages 100 and 101 correspond to the components of the unbalance vector and are applied via the electronic switch 105 and its output terminals 106 and 107 to the horizontal adding and deflecting amplifier 108 and the vertical adding and deflecting amplifier 109.

Simultaneously with the application of the direct voltages to the horizontal adding and deflecting amplifier 108 and the vertical adding and deflecting amplifier 109, sinusoidal voltages 113 and 114 (FIGS. 3a and 3b) are applied via the terminals 113 and 114, the electronic switch 105 and the outputs 110 and 111 to the horizontal adding and deflecting amplifier 108 and the vertical adding and deflecting amplifier 109. The sinusoidal voltage 113 (FIG. 3a) is a sine function $U_E \sin \omega t$ and the sinusoidal voltage 114 (FIG. 3b) is a cosine function $U_K \cos \omega t$. These functions vary relative to time and are small compared to the direct voltages 100 and 101. The sinusoidal functions produce the horizontal and vertical deflection voltages and correspond to the components of the unbalance vectors.

Figure 2A:
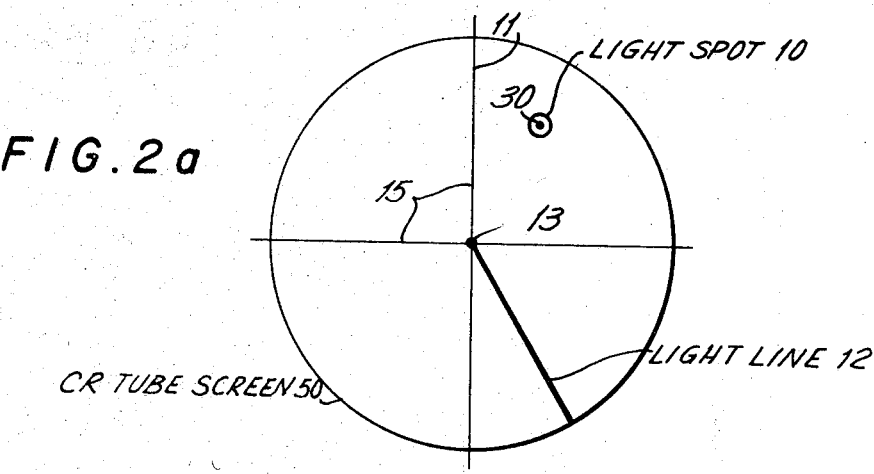
FIGS. 2a, 2b and 2c are schematic indications of the screen of the cathode ray tube of the embodiment of FIG. 1 under different circumstances involving a single plane.
Figure 2B:
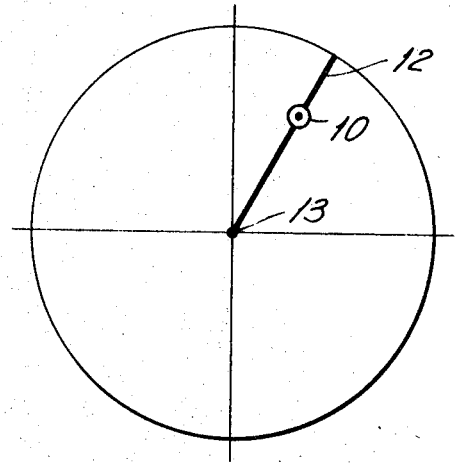
Figure 2C:
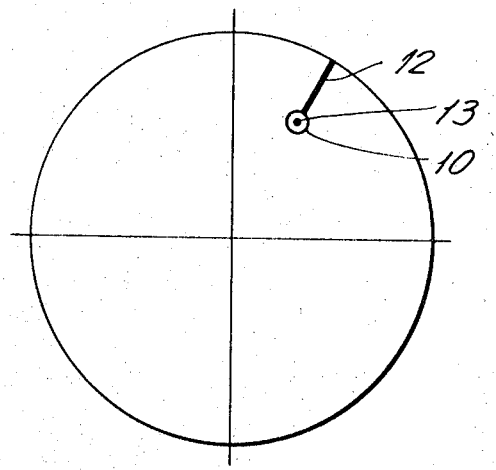
Figure 3A:
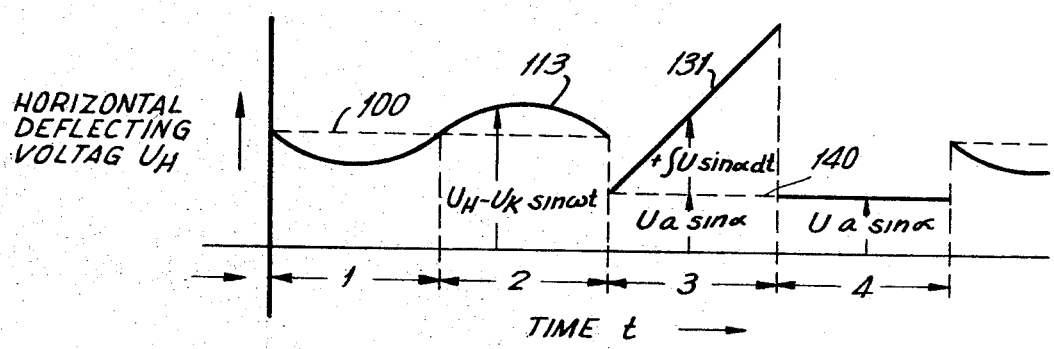
FIGS. 3a and 3b are graphical presentations of deflection voltages corresponding to the screen indications of FIGS. 2a, 2b and 2c.
Figure 3B:
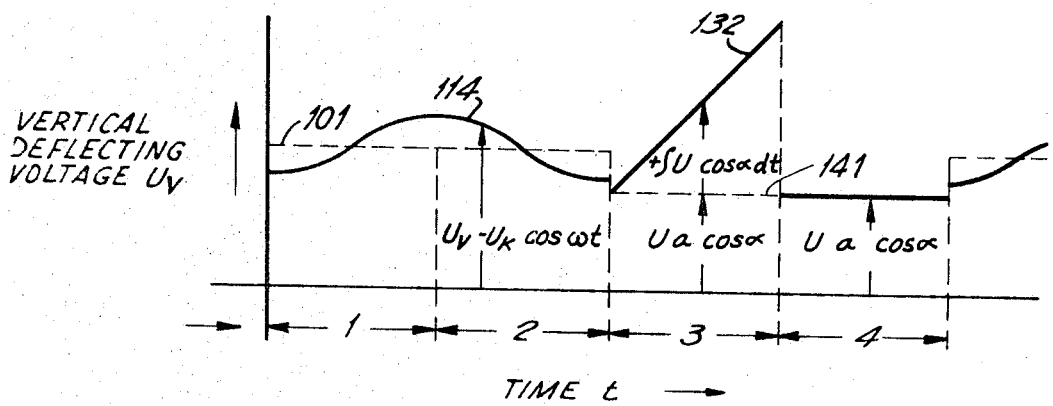

The horizontal adding and deflecting amplifier 108 and the vertical adding and deflecting amplifier 109 thus deflect the electron stream and displace it on the screen 50 (FIG. 2a) of the cathode ray tube 115 (FIG. 1) in a manner whereby the light spot 10 is produced on said screen (FIGS. 2a, 2b and 2c). As shown in FIGS. 2a, 2b and 2c, the center or center point 30 of the light spot 10 is positioned on the screen 50 relative to the zero origin point of a Cartesian coordinate system 15 (FIG. 2a) which is positioned at the center of said screen. The light spot 10 indicates the quantity and angular position of the unbalance. The shortest distance of the center 30 of the light spot 10 from the zero coordinate point of the coordinate system 15, which is the reference point, corresponds to the magnitude of the unbalance. The angular position of the light spot 10 relative to the vertical coordinate axis 11 (FIG. 2a) corresponds to the angular position of the unbalance.

The direct voltages 100 and 101, which correspond to the component magnitudes or values of the unbalance are stored in the horizontal memory unit 116 and in the vertical memory unit 117, respectively, so that they are still available after the completion of the unbalance indicating operation and the indication remains on the screen 50 of the cathode ray tube 115.

As shown in FIGS. 3a and 3b, the integrator 130 (FIG. 1) integrates two direct voltages 131 and 132 supplied by the angular position device in the corresponding leads 131 and 132, in the third period of operation. The integrated voltages 131 and 132 correspond to the sine and cosine of the angle α of insertion. During the third period of operation, the two integrated direct voltages 131 and 132 (FIGS. 3a and 3b) effect the deflection of the electron stream via the adding and deflecting amplifiers 108 and 109 by producing a line 12 of light (FIGS. 2a, 2b and 2c). The light line 12 indicates information regarding the insertion angle. Furthermore, during the third period of operation, direct voltages 140 and 141, applied to the corresponding terminals, are derived from potentiometers which indicate the depth of penetration of the balancing too (not shown in FIG. 1, but included in the balancing apparatus 99). The direct voltages 140 and 141 are applied to the horizontal adding and deflecting amplifier 108 and the vertical adding and deflecting amplifier 109 via the electronic switch 105 and the outputs 142 and 143 thereof. The direct voltages 140 and 141 thus deflect the origin 13 (FIGS. 2a, 2b and 2c) of the light line 12 along said light line, as shown in FIG. 2c.

During the fourth period of operation, only the output voltages of a position indicator or sensor affect the deflection of the electron stream. The position indicator (not shown in FIG. 1, but included in the balancing apparatus 99) supplies data representing the depth of penetration of the balancing tool in the specimen of body and converts such data into a proportional position of the sensor of the two potentiometers which provide depth of penetration data. This results in the origin of the light line 12 becoming a light spot 13 superimposed upon the light spot 10, as shown in FIG. 2c.

Upon completion of the indicating operation, the specimen is rotated in a manner whereby the light line 12 (FIG. 2b) extends through the center 30 (FIG. 2a) of the light spot 10 of the unbalance vector. As a result, the point of the specimen or body which bears excess mass is positioned beneath the balancing tool. After the balancing tool penetrates the specimen, the origin 13 of the light line 12 is displaced due to the direct voltages 140 and 141 which vary via a sensor at the potentiometers. The origin of the light line 12 is thus removed or extinguished in the direction of the unbalance vector toward the light spot 10. The data supplying equipment of the balancing apparatus 99 is so adjusted that when the center point 30 of the light spot 10 has been reached by the light line 12, the unbalance mass is removed from the specimen of the balancing tool.

Figure 4A:
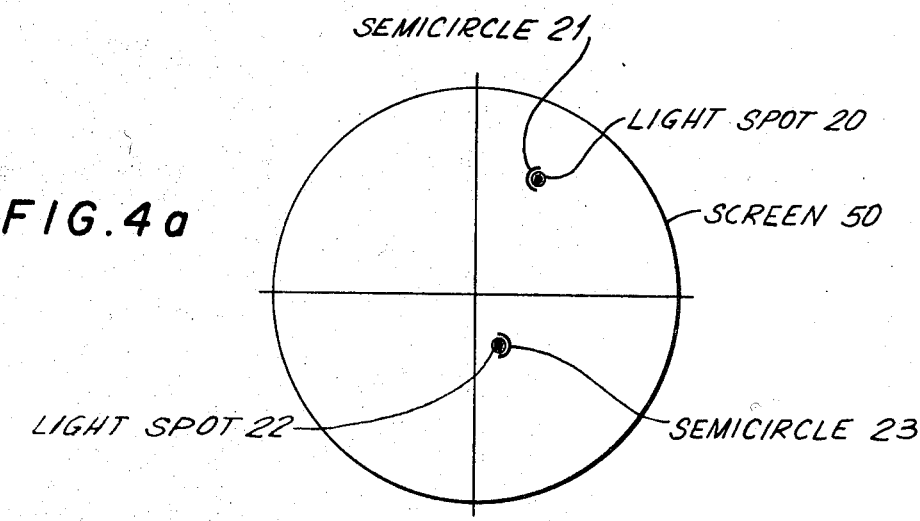
FIGS. 4a, 4b and 4c are schematic indications of the screen of the cathode ray tube of the embodiment of FIG. 1 under different circumstances involving a plurality of different planes.
Figure 4B:
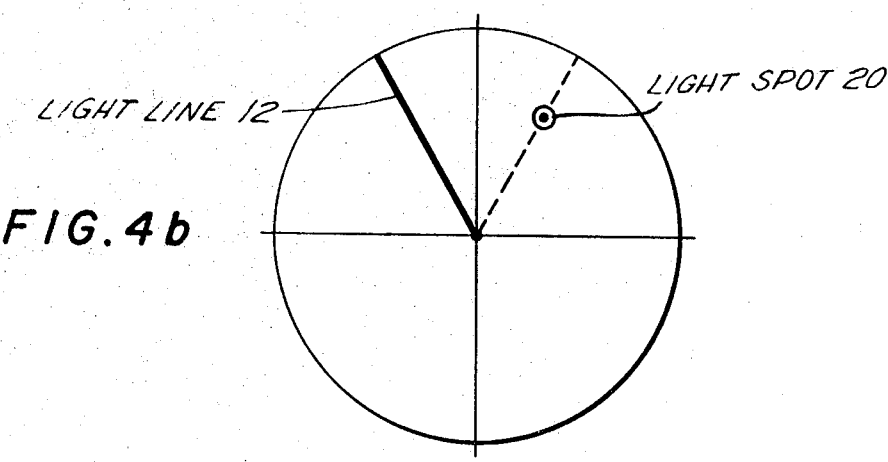
Figure 4C:
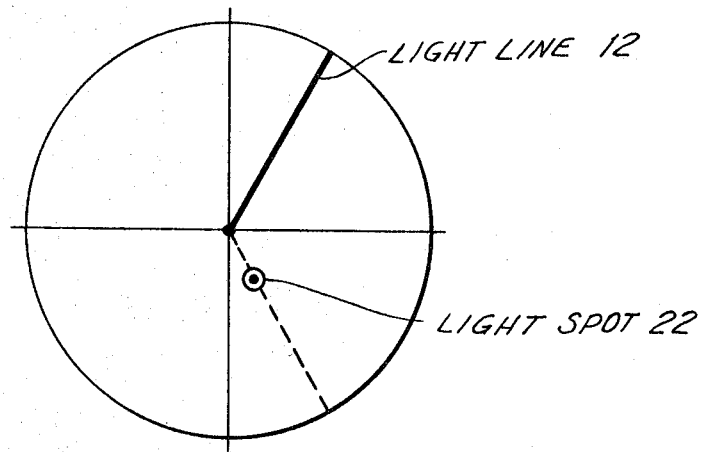
Figure 5A:
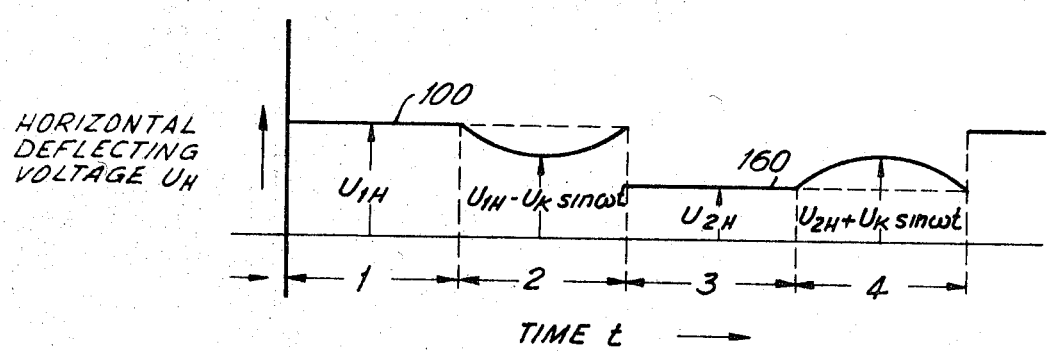
FIGS. 5a and 5b are graphical presentations of deflection voltages corresponding to the screen indications of FIGS. 4a, 4b and 4c.
Figure 5B:
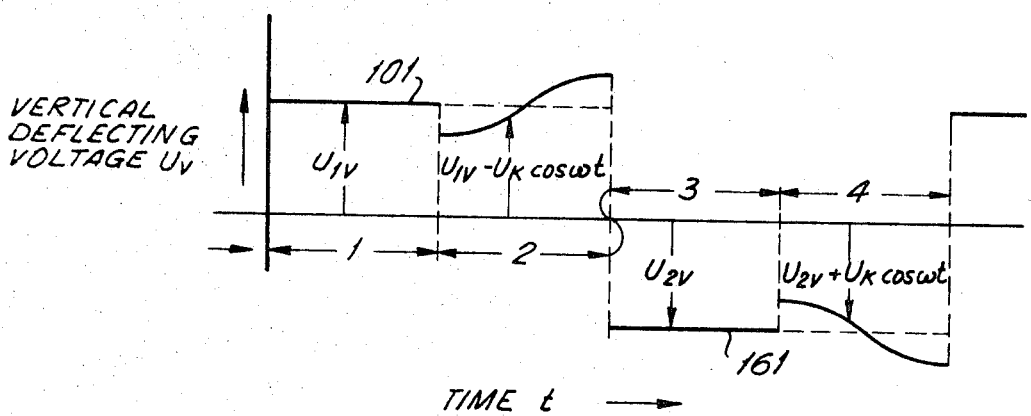

For balancing operations in the two different planes, the present invention functions in the manner illustrated in FIGS. 4a, 4b, 4c, 5a and 5b. During the first period of the cycle of operation, the direct voltages 100 and 101, which correspond to the unbalance components in a single plane, cause the deflection of the electron stream in a manner whereby a light spot 20 (FIGS. 4a and 4b), which corresponds to the unbalance vector is produced on the screen 50 of the cathode ray tube 115 (FIG. 4a). The direct voltages 100 and 101 are illustrated in FIGS. 5a and 5b.

During the second period of the cycle of operation, a sinusoidal half-wave function is imposed upon the voltages at the outputs 110 and 111 of the electronic switch 105 (FIGS. 5a and 5b). The sinusoidal function superimposed upon the direct voltage 100 is a sine function $U_K \sin \omega t$ (FIG. 5a) and the function superimposed upon the direct voltage 101 is a cosine function $U_K \cos \omega t$. The superimposed voltages are applied to the horizontal adding and deflecting amplifier 108 and the vertical adding and deflecting amplifier 109. The half-wave sinusoidal voltages are small relative to the magnitude of the direct voltages 100 and 101, as seen in FIGS. 5a and 5b. This results in the production of a semicircle 21 next adjacent the light spot 20 (FIG. 4a). The semicircle 21 is coaxial and concentric with the light spot 20 and characterizes the first of two planes.

During the third period of operation, the electron stream is deflected by the unbalance components indicated by the voltages 160 and 161 applied to the corresponding terminals (FIG. 1) for the second of the two planes. This is illustrated in FIGS. 5a and 5b as illustrated in FIGS. 5a and 5b, during the fourth period of the cycle of operation, a sinusoidal half-wave voltage is superimposed upon the corresponding direct voltage to provide a resultant deflection voltage. The sinusoidal half-wave voltage added during the fourth period of the cycle of operation is opposite in polarity to the corresponding sinusoidal half-wave voltage superimposed upon the direct voltage during the second period of the cycle of operation. Thus, the functions $U_K \sin \omega t$ during the second and fourth periods of the cycle of operation are 180° displaced from each other in phase, as are the functions $U_K \cos \omega t$. This re-results in the production of a second light spot 22 of the unbalance vector representing the second plane 2 of the two planes and a second semicircle 23 (FIG. 4a).

The positions of the semicircles 21 and 22 for horizontal balancing apparatus with a left balancing plane and a right balancing plane are preferably so selected that the unbalance indication of the left balancing plane is indicated by the semicircle positioned to the left of the end point of the vector and the unbalance indication for the right balancing plane is indicated by the semicircle positioned to the right of said end point. For vertical balancing apparatus, the indication may be selected in a manner whereby for the upper balancing plane the semicircle is positioned above the end point of the vector and for the lower balancing plane the the semicircle is positioned below said end point.

The function switch 150 provides a simultaneous indication of unbalance and balance values or magnitudes. When the function switch is in its first position, as hereinbefore described, the unbalance vectors for both planes are simultaneously indicated, as hereinbefore described, while the specimen is rotated (FIG. 4a). When the function switch 150 is in its second position, the unbalance magnitudes of the two planes are stored in the memory units 116 and 117 (FIG. 1) and the apparatus is brought to a standstill. The unbalance magnitudes or values are then indicated for one of the planes simultaneously, with the light line 12 indicating the angle of insertion $\alpha$ and the depth of penetration of the balancing tool (FIG. 4b). When the function switch 150 is in its third position, the same magnitudes as indicated in the second position of said switch are indicated for the other of the two planes (FIG. 4c). A plurality of planes may be balanced and indicated in a corresponding manner.

While the invention has been described by means of specific examples and in specific embodiments, I do not wish to be limited thereto, for obvious modifications will occur to those skilled in the art without departing from the spirit and scope of the invention.

I claim:

1. A method for indicating unbalance values of a body and for controlling the balancing of the body, comprising the steps of
   simultaneously indicating on the screen of a cathode ray tube light spots representing unbalance values of the body of direction and magnitude in different planes;
   positioning the light spot on the screen relative to a reference point in accordance with the sum and angular position of the unbalance;
   storing the unbalance values of direction and magnitude in different planes;
   producing a line of light on the screen extending from the reference point and indicating the instantaneous position of the unbalance on the body;
   balancing unbalance of the body and adjusting the light line relative to the light spots sequentially for the different planes by rotating the body; and
   removing the unbalance of the body and removing the light line in accordance with the removing of the unbalance of the body commencing with the reference point and toward the light spot until said light spot is reached.

2. A method for indicating unbalance values of a body and for controlling the balancing of the body, comprising the steps of
   indicating on the screen of a cathode ray tube a light spot representing an unbalance value of the body of direction and magnitude in a single plane;
   positioning the center of the light spot on the screen relative to a reference point in accordance with the sum and angular position of the unbalance;
   storing the unbalance values of direction and magnitude;
   producing a line of light on the screen extending from the reference point and indicating the instantaneous position of the unbalance on the body;
   balancing unbalance of the body and adjusting the light line relative to the light spot by rotating the body; and
   removing the unbalance of the body and removing the light line in accordance with the removing of the unbalance of the body commencing with the reference point and toward the center of the light spot until said light spot is reached.

3. A method as claimed in claim 1, wherein the light spots are produced by direct voltages corresponding to the components of the unbalance vector.

4. A method as claimed in claim 2, wherein the light spot is produced by direct voltages corresponding to the components of the unbalance vector.

5. Apparatus for indicating unbalance values of a body and for controlling the balancing of the body, said apparatus comprising
   memory means having inputs and outputs;
   first input means connected to the inputs of said memory means for supplying electrical signals to said memory means in accordance with unbalance values of the body, said memory means providing at its outputs direct voltages characteristic of said unbalance values;
   horizontal adding and deflecting amplifier means having an input and an output for providing horizontal deflection voltages;
   vertical adding and deflecting amplifier means having an input and an output for providing vertical deflection voltages;
   switching means for providing electrical signals supplied thereto in time division multiplex arrangement;
   integrating means for integrating electrical signals;
   second input means coupled to the inputs of said horizontal and vertical adding and deflecting amplifier means via said switching means for supplying voltages characteristic of the position of balance correcting means in time division multiplex arrangement;
   third input means coupled to the inputs of said horizontal and vertical adding and deflecting amplifier means via said integrating means for supplying voltages characteristic of the angular position of unbalance in said body; and
   a cathode ray tube having a screen, electron means for producing a stream of electrons and directing said stream of electrons onto said screen, horizontal deflection means connected to the output of said horizontal adding and deflecting amplifier means for controlling the horizontal displacement of said stream of electrons on said screen, and vertical deflection means connected to the output of said vertical adding and deflecting amplifier means for controlling the vertical displacement of said stream of electrons on said screen.

6. Apparatus as claimed in claim 5, further comprising function switch means connected between said memory means and said second input means and said switching means for selectively supplying said direct voltages characteristic of said unbalance values and said voltages characteristic of the position of balance correcting means to said switching means.

7. Apparatus as claimed in claim 5, further comprising fourth input means coupled to the inputs of said horizontal and vertical adding and deflecting amplifier means via said switching means for supplying additional small sinusoidal voltages to said horizontal and vertical adding and deflecting amplifier means to indicate said light spot.

8. Apparatus as claimed in claim 5, further comprising fifth input means coupled to the inputs of said horizontal and vertical adding and deflecting amplifier means for supplying additional small sinusoidal half-wave voltages to said horizontal and vertical adding and deflecting amplifier means to represent the plane of said light spot.

9. Apparatus as claimed in claim 6, wherein said function switch means has three switching positions, in a first of which the outputs of said memory means are connected to said switching means thereby supplying unbalance values for two planes during rotation of said body, in a second of which selected outputs of said memory means and said second input means are connected to said switching means thereby storing the unbalance values of said two planes and permitting said body to be brought to a standstill and causing the light line on the screen of said cathode ray tube to indicate the insertion angle for one of said two planes and the depth of penetration of balance correcting means, and in a third of which selected other outputs of said memory means and said second input means are connected to said switching means thereby storing the unbalance values of said two planes and permitting said body to be brought to a standstill and causing the light line on the screen of said cathode ray tube to indicate the insertion angle for the other of said two planes and the depth of penetration of balance correcting means.

10. Apparatus as claimed in claim 7, wherein the sinusoidal voltages supplied by said fourth input means are superimposed upon said direct voltages characteristic of said unbalance components.

11. Apparatus as claimed in claim 8, wherein the sinusoidal half-wave voltages supplied by said fifth input means are superimposed upon said direct voltages characteristic of said unbalance components.

References Cited
UNITED STATES PATENTS

| | | | |
|---|---|---|---|
| 3,220,247 | 11/1965 | Goodman | 73—465X |
| 2,748,603 | 6/1956 | Wilcox. | |

FRANCIS S. HUSAR, Primary Examiner

U.S. Cl. X.R.

73—465